(12) United States Patent
Kotaluoto et al.

(10) Patent No.: US 7,174,155 B2
(45) Date of Patent: Feb. 6, 2007

(54) CHARGING IN COMMUNICATION SYSTEMS

(75) Inventors: Karri Kotaluoto, Vesilahti (FI); Jukka Ahonen, Tampere (FI)

(73) Assignee: Nokia Corporation, Espoo (FI)

( * ) Notice: Subject to any disclaimer, the term of this patent is extended or adjusted under 35 U.S.C. 154(b) by 122 days.

(21) Appl. No.: 10/363,398

(22) PCT Filed: Aug. 30, 2001

(86) PCT No.: PCT/EP01/10120

§ 371 (c)(1),
(2), (4) Date: Sep. 22, 2003

(87) PCT Pub. No.: WO02/19686

PCT Pub. Date: Mar. 7, 2002

(65) Prior Publication Data

US 2004/0048599 A1   Mar. 11, 2004

(30) Foreign Application Priority Data

Sep. 1, 2000   (GB) ................................. 0021543.4

(51) Int. Cl.
*H04M 11/00*   (2006.01)
(52) U.S. Cl. ...................... 455/406; 455/408; 455/405; 379/114.2; 379/114.23; 379/114.22; 379/114.17
(58) Field of Classification Search ................ 455/405, 455/406, 408; 379/114.2, 114.23, 114.22, 379/114.16, 114.17
See application file for complete search history.

(56) References Cited

U.S. PATENT DOCUMENTS 5,946,614 A   8/1999   Robbins et al.
5,991,616 A * 11/1999   Mirza et al. ................ 455/406
5,995,822 A * 11/1999   Smith et al. ................ 455/406
2003/0165135 A1* 9/2003   Itzkovitz et al. ............ 370/352
2004/0009760 A1* 1/2004   Laybourn et al. ........... 455/405

FOREIGN PATENT DOCUMENTS

| EP | 0 346 897 A2 | 12/1989 |
| EP | 1 014 619 A1 | 6/2000 |
| JP | 2000-101754 | 4/2000 |
| JP | 2000-101754 A * | 4/2000 |
| WO | WO 99/34590 | 7/1999 |

* cited by examiner

*Primary Examiner*—Lester G. Kincaid
*Assistant Examiner*—Dung Lam
(74) *Attorney, Agent, or Firm*—Squire Sanders & Dempsey LLP (57) ABSTRACT

The present invention relates to charging of communications using chargeable resources of a first communication system and a second communication system wherein at least one of said communication systems provides wireless communication services. In accordance with the method, after a set-up procedure for communications initiated a first procedure for obtaining a first charging component is triggered, the first charging component being associated with the first communication system and determined based on a first charging model. If required, a second procedure for obtaining a second charging component is also triggered, the second charging component being associated with the second communication system and determined based on a second charging model. Information associated with the communications in the first and second communication systems is processed simultaneously to obtain the respective first and second charging components. The first and second charging components are combined to obtain a total charge. A prepaid balance is then decreased during the communications based on the total charge.

26 Claims, 5 Drawing Sheets

CHARGING IN COMMUNICATION SYSTEMS

FIELD OF THE INVENTION

The present invention relates to charging in communication systems, and in particular to communication systems enabling prepayment of communication services.

BACKGROUND OF THE INVENTION

A communication system may provide a subscriber with a fixed line connection or a wireless connection for communication, such as for voice or data communication. An example of the fixed line systems is the public switched telephone network (PSTN). An example of a wireless communication system is the public land mobile network (PLMN) and another example is a satellite based mobile communication system. The wireless communication occurs typically via a radio frequency connection between the station of the subscriber and at least one network element of the communications system. Communication within the network is typically, but not necessarily, handled by fixed line connections between the various network elements. Communication may also be transmitted in a system comprising one or more data networks. An example of this is the voice over IP (Internet Protocol) arrangement enabling voice call over a packet switched data network. The communication system may also employ a combination of wireless, fixed line and/or data network communication for a connection between two terminals. The term "connection" is intended to refer to all types of communication between two signalling points, such as a user terminal. The communication via the connection may be, for example, in the form of a voice call or a multimedia call or a data communication session.

A communication system typically operates in accordance with a standard or specification which sets out what the various elements of the network are permitted to do and how that should be achieved. For example, the standard or specification may define whether the user, or more precisely, user equipment or terminal is provided with circuit switched and/or packet switched service. The standard or specification may also define the various communication protocols and/or parameters which shall be used for the connection. In other words, the standards and/or specifications define the "rules" on which the communication and various associated functions can be based on. The various functions that are based on these rules may be arranged in predefined layers, e.g. to so called protocol stacks.

In addition to basic voice and data services, the users of the subscriber terminals (such as fixed line telephones, data processing devices or PLMN mobile stations) may be provided with additional or advanced services. These can be defined as functions providing various sophisticated services or value-added services to the subscribers, for instance by means of software and/or hardware implementations provided in one or several nodes of the communication system. The additional services requested and subsequently invoked for a connection typically require control of at least one of the call management functions (e.g. routing, charging, duration, provision of connection or user related data and so on).

The additional services can be implemented by means of a functionality that is often referred to as intelligent network (IN). The term "intelligent network" was introduced by the BELLCORE organisation (U.S.A.) in the mid eighties. The intelligent network (IN) concept was developed in order to increase the flexibility and competitiveness of the telecommunication network architecture. Even though the initial IN architectures were developed to implement only certain specific services, for example service number, the current IN solutions provide the communication network operators with a possibility to implement new, powerful services in their networks in a fast and cost-effective manner.

The basic principles and operation of the IN applications are well known, and therefore they are not described herein in more detail. It is sufficient to note that in general the IN architecture comprises a (service) switching point (SSP) for triggering a call to the IN services and a (service) control point (SCP) for providing the service. The SSP and the SCP functions may be integrated in a service switching and control point (SSCP). A more detailed description of the general IN concept can be found e.g. from the recommendations by the International Telecommunications Union (ITU-T), such as IN Capability Set CS-1 published in 1993. The IN concept can be implement in the fixed land line networks, such as the public switched telephone network (PSTN), or the wireless radio communication networks, such as the public land mobile network (PLMN). Customised applications for mobile network enhanced logic (CAMEL) application part (CAP) protocol may be used in the SCP of a PLMN system for the provision of the service logic.

A service available for the subscribers is so called prepaid service. In a prepaid service arrangement the user of a terminal, such as a mobile station, may purchase beforehand a certain predefined amount of calling time or other service time. The prepaid amount will be referred to as balance. The balance may be purchased in any appropriate manner, e.g. by purchasing calling cards or vouchers, by means of a bank transfer, and so on. The balance will be stored in a prepayment account implemented by means of the intelligent network. The user may then make calls against his/hers account until the balance in the prepayment account runs out. It may also be possible for the user to reload more balance in the account, or the user may simply purchase a new prepaid account after the balance in the previous account has run out. Although the prepaid account holders can be identified, it is also possible that the prepaid accounts are anonymous, i.e. the operator does not necessarily know the identity of the owner of the account.

In the prepayment service a call may be charged by deducting (decrementing) during the call the balance on the account based on a calculated charge parameter that will referred to herein as a call charge. The call charge may be calculated based on a charging component. The call charge may be calculated by means of the intelligent network based on information that associates with the chargeable resource of the communication system. In some application the calculation is accomplished by means of a controller of the network, such as the mobile switching center or a specific billing centre. For example, in a GSM standard (Global System for Mobile communications) the call charge component may be calculated based on charging components that are referred to as e-parameters or main charging zone (MCZ) parameters. It should be noted that other standards may employ differently named parameters for the same purposes. The charging component for a call is typically obtained from a controller of the systems, such as from a mobile switching center (MSC) of the GSM system, for the calculation of the call charge, i.e. the calculation of the amount that is to be deducted from the balance.

The operator of a network may want to offer free connection time or other service time for the subscribers to the network. The operator may wish to do so e.g. on selected days or selected times of a day. If the operator wants to offer free airtime for those mobile subscribers that use prepaid services, this may be accomplished at the mobile network by waiving any airtime charges off. However, if the call is made to a terminal connected to another network, e.g. to a terminal connected to a PSTN, the operator of the originating network may become liable for clearing charges later on for the use of the resources of said other network regardless the nature of the charging (post paid or prepaid charging). Clearing of call charges incurred in the other networks usually takes few days to accomplish. The operators of the originating network may however, wish to charge also these charges from the subscriber who originated the call even if the call was made by a prepaid subscriber.

To be able to establish at once the total call charge for call made using the chargeable resources of at least two networks, the intelligent network (IN) of the originating network should know the charging components from all networks involved. However, the controller of the originating or first network (such as the MSC) does not necessarily get this charging information from the destination or the second network in all current charging applications. This may cause problems especially when the originating terminal pays for the connection by means of a prepayment service, since the system should be able to deduct the charges during the connection from the balance associated with the originating terminal.

The above situation is clarified by means of the following example. Although the mobile switching center (MSC) of a PLMN system may obtain the charging component that is associated with the charges in the PLMN system, the mobile switching center does not necessarily receive all information required for the charging from the PSTN e.g. via ISUP (ISDN User part) signalling. If the operator of the PSTN does not want to transfer charging messages via the ISUP signalling to other networks, such as to the PLMN, then the calculation of components need to be generated in the PSTN where the charges incurred. That is, the required charging definitions have to be precalculated in the home PSTN network if the charging information is not transferred to other networks e.g. by means of the ISUP. The charges need also to be cleared later on between the operators of the two networks. In the post paid charging arrangements this is usually not a problem since the cleared charges can be added to the bill of the PLMN subscriber later on in a billing centre of the PLMN operator. However, this is not possible with the subscribers to the prepaid services, as their charging should occur immediately during the connection.

Although it may be possible to provide the controller of a network, such as the MSC of a PLMN, with information regarding the use of resources in all networks, the controller cannot calculate these different components separately. In conventional post-payment arrangements this is not usually a problem since the charges for a call can be sorted out later on. However, in the prepayment arrangements the services have to be charged immediately. The services also have to be charged in their entirety during the call. The controller may not be made aware of all of the charging components and/or the controller may not be able to calculate all of the needed components and/or to calculate the components separately. Therefore, although the originating network may be able to produce some kind of estimate of the charges for the prepaid subscribers, the charging of the pre-paid subscribers may still be inaccurate.

A problematic situation may also occur when more than one independently operating charging model is used for a call from a common termination point. Different call charge control features used in the different charging and tariff schemes may be in conflict with each other and/or may not interact in a proper manner. The different charging models and/or the charging components produced by the different models may not even be used for a single connection.

For example, in some cellular communication systems the mobile station originated call tariffs have two different components. The exemplifying two components will be referred to as 'an Airtime Charge' and 'a PSTN charge'. These two components are first computed independently and subsequently summed together e.g. in the post payment billing centre to obtain the total call charge. The Airtime rate may depend on various parameters, such as the time of day, the subscriber category, the rate plan to which the subscriber has signed on, the destination of the call and so on. The PSTN component may also depend on various factors such as the time of day, the distance to the called destination, subscriber profile and so on. The Airtime and PSTN components may increment in different time units. For example, the Airtime component may increment once per minute while the PSTN component may increase every 30 seconds. It is also possible that one of the components is incremented in units that do not dependent on time (e.g. in pulses). The tariff structures of the two charging models may be substantially different from each other.

A connection set-up procedure for establishing a connection between two terminals may be based on use of a originating state model. One possible originating state model is the Originating Basic Call State Model (OBCSM) of the Intelligent Network Application Part (INAP) protocol suite. The INAP OBCSM is a typical example of the first (originating) phase of call set-up procedures. However, the inventors have found that the controller of the originating network cannot calculate independently the two or more charging components at the same time in a same originating state model. For example, the MSC is not enabled to handle simultaneously the two charging components in the same protocol (e.g. INAP or CAP) and to report them to the SCP independently from each other. Thus the service control point (SCP) may receive information of one charging component only since only one protocol can be used at the MSC. On the other hand, the inventors have also found that the SCP cannot proceed to calculate more than one of the charging components based on a single triggering at the service switching point (SSP).

SUMMARY OF THE INVENTION

Embodiments of the present invention aim to address one or several of the above problems.

According to one aspect of the present invention, there is provided a method for charging in communication systems, the method comprising the steps of: initiating a set-up procedure for communications, the communications using chargeable resources of a first communication system and a second communication system, at least one of said communication systems providing wireless communication services; triggering in a charging function a first procedure for obtaining a first charging component for the communications, the first charging component being associated with the first communication system and determined based on a first charging model; triggering in the charging function a second procedure for obtaining a second charging component for the communications, the second charging component being associated with the second communication system and determined based on a second charging model; simultaneously processing in the charging function information associated with the communications in the first and second communication systems based on the first and second charging models to obtain the respective first and second charging components; combining the first and second charging components to obtain a total charge; and decreasing a prepaid balance during the communications based on the total charge.

According to another aspect of the present invention there is provided a arrangement for communication systems, comprising: a node in a first communication system for initiating a set-up procedure for communications via the first communication system and a second communication system, at least one of said communication systems providing wireless communication services; trigger means for starting a first procedure for obtaining a first charging component for the communications, the first charging component being associated with the use of chargeable resources of the first communication system; trigger means for starting a second procedure for obtaining a second charging component for the communications, the second charging component being associated with the use of chargeable resources of the second communication system; and controller means responsive to triggering signals from the trigger means, the controller means being adapted for simultaneous processing of charging information associated with the communications in the first and second communication systems to obtain the respective first and second charging components, said first charging component being determined based on a first charging model and the second charging component being determined based on a second charging model, for combining the first and second charging components to obtain a total charge, and for decreasing a prepaid balance based on the total charge during the communications.

The embodiments of the invention may enable prepayment services that are capable of handling two or more different charging schemes. It is possible to separate different charging components and/or tariffs and/or the processing thereof from each other. The embodiments may enable a substantially real-time charging of the subscribers to prepaid services during the communications even in occasions where another network does not provide charging information during the connection. The same solution may be used with overlay solution when a transit switching center is used for triggering to the intelligent network services.

BRIEF DESCRIPTION OF DRAWINGS

For better understanding of the present invention, reference will now be made by way of example to the accompanying drawings in which.

DESCRIPTION OF PREFERRED
EMBODIMENTS OF THE INVENTION

Figure 1:
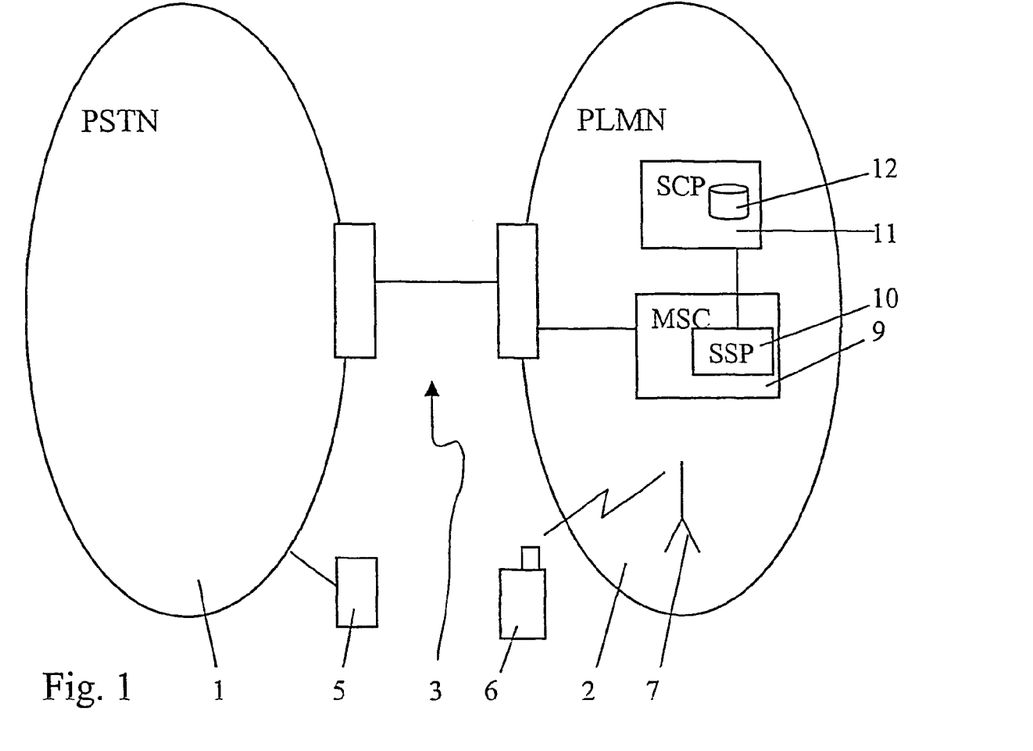
FIG. 1 is a schematic presentation of a communication system.

Reference is made to FIG. 1 which shows a communication system consisting of two different networks 1, 2 in which the embodiments of the present invention may be used. More particularly, FIG. 1 shows a PSTN network 1 and a PLMN network 2 and gateway means 3 between the two networks. A terminal 5 subscribing to the PSTN 1 is shown to have a fixed line connection with the PSTN system 1. A mobile station 6 is enabled to communicate over a wireless connection with a base station 7 of the PLMN system 2.

It should be appreciated that although the following embodiments describe elements and functions of a GSM PLMN system and a conventional PSTN this invention is also applicable to any other standard and communication system as well where applicable. For example, without limiting to these, the connection may originate from and/or terminate in a third generation communication system, such as the UMTS (Universal Mobile Telecommunication system) or i-Phone or IMT 2000 (International Mobile Telecommunication System 2000) and so on.

The PLMN system of FIG. 1 is shown to comprise a controller 9. More particularly, the shown controller comprises a mobile switching center (MSC) adapted to operate in accordance with the GSM standard. It should be appreciated that the PSTN and PLMN networks may comprise various other elements, such as switches, various controllers and gateways and internal connections for enabling communication between two or several terminals than those elements that are shown in FIG. 1. However, for clarity reasons and since the other elements and/or connections are not important in understanding the invention, they are shown and described in more detail.

FIG. 1 shows further a service switching point (SSP) 11 as an entity integrated with the mobile switching center 9. The switching point is adapted to trigger any signalling that requires processing by a service control point (SCP) 11 of the IN arrangement to be directed to the SCP. The SSP enables enquiries for instructions or any other necessary signalling between the MSC 9 and the SCP (the service provider) 11. In other words, the MSC/SSP node 9, 10 is for providing triggering functions for the embodiments.

The service control point (SCP) 11 is in turn provided for the control of the prepayment services provided for the A-subscriber 6. In this example the A-subscriber refers to the calling subscriber i.e. the originating party of a call. The control point 11 contains necessary data and logic for the given IN service. In general, the service control point 11 may receive a request from the service switching point, execute the requested services and return the necessary information or other data to the switching point. The control point 11 is enabled to handle various functions, such as charging and management of the used services. An appropriate general functional definition element (FDE) may be used in the implementation of the SCP 11. It should be appreciated that the SCP 11 may be designed according to any special needs by the operators.

The service control point 11 implements an account 12 for storing a prepaid balance for the mobile subscriber 6. The balance on the account is decrement based on computed overall charge for the used services, as will be explained in more detail below.

Figure 2:
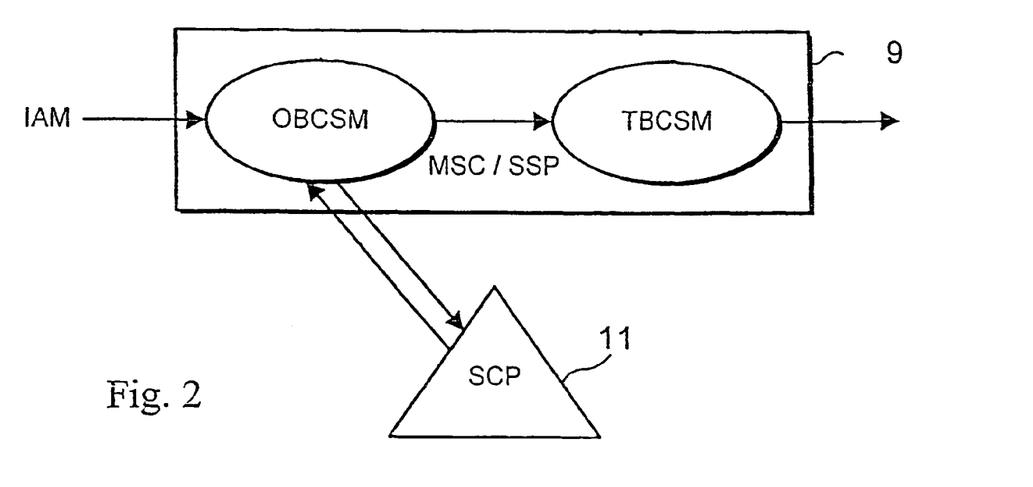
FIG. 2 is a schematic presentation illustrating call state models and triggering of IN calls.

FIG. 2 shows how the signalling within the IN system may be arranged during call set-up procedures relative to the different call state models of the Intelligent Network Application Part (INAP) protocol suite. The interface between the mobile switching centre and the service control point may be based on the intelligent network application protocol (INAP) and/or the customised applications for mobile network enhanced logic (CAMEL) application part (CAP) protocol. So called CAMEL service environment (CES) may be used to provide the execution environment within a CAMEL SCP executing a service logic, the CAMEL protocol being an internal protocol for the SCP.

Before explaining the preferred embodiment in more detail, a brief description of possible call state models will be given with reference to FIG. 2, as this is believed to help in understanding the embodiment. During the call set-up the service control point (SCP) 11 controlling the calling subscriber may have signalling connection for receiving and/or sending information during an Originating Basic Call State Model (OBCSM) of the Intelligent Network Application Part (INAP) protocol suite. The OBCSM is typically the first (originating) phase of the call set-up after an IAM (Initial Address Message) arrives the MSC controller 9. FIG. 2 illustrates also a Terminating Basic Call State Model (TBCSM) of the INAP protocol suite, which is a later phase of the call processing model.

The embodiments described in the following may provide a feasible solution to a situation where call charging needs to be based on two (or more) different charging components, for example on fixed line system charges and wireless system charges. In a preferred embodiment separate charging function and tariffs function are provided for both components. The processes used for obtaining the different charging components are preferably run independently from each other. Information about the total charge is obtained by combining the charging components at the service control point 11. Before the combining procedures, the service control point may convert one of the components or even or all components into a compatible format.

Figure 3:
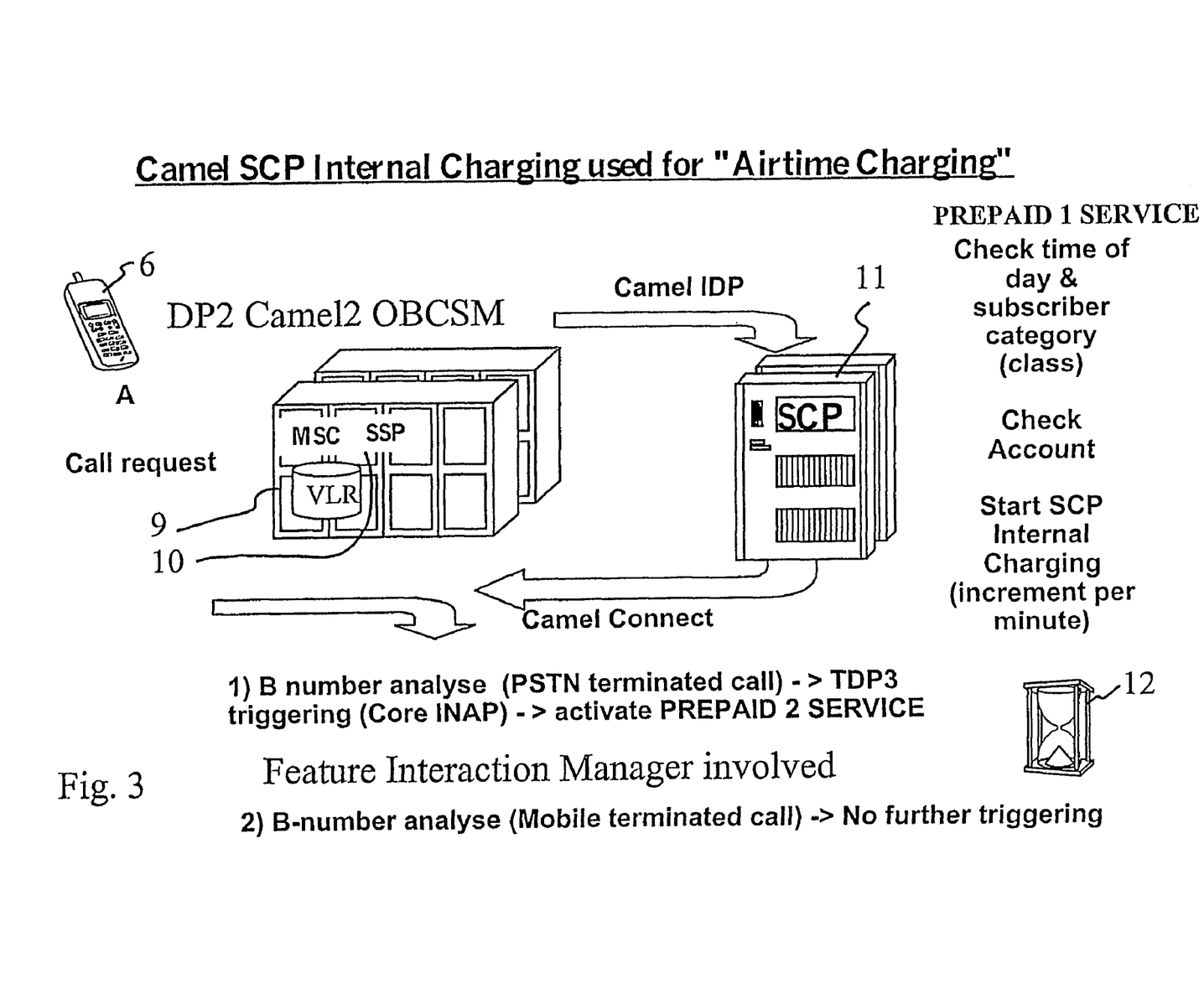
FIGS. 3 to 5 illustrate one embodiment of the present invention.
Figure 4:
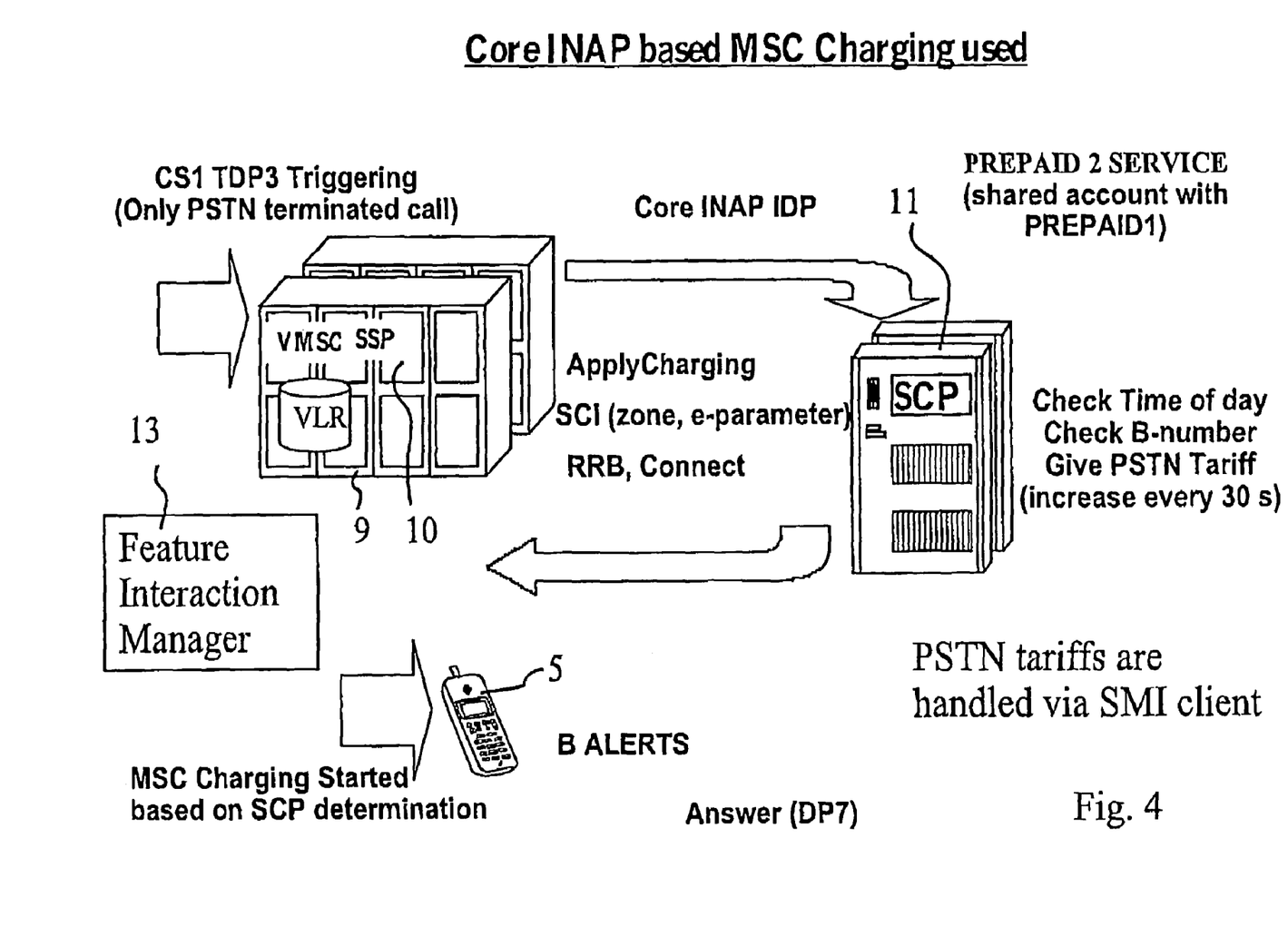
Figure 5:
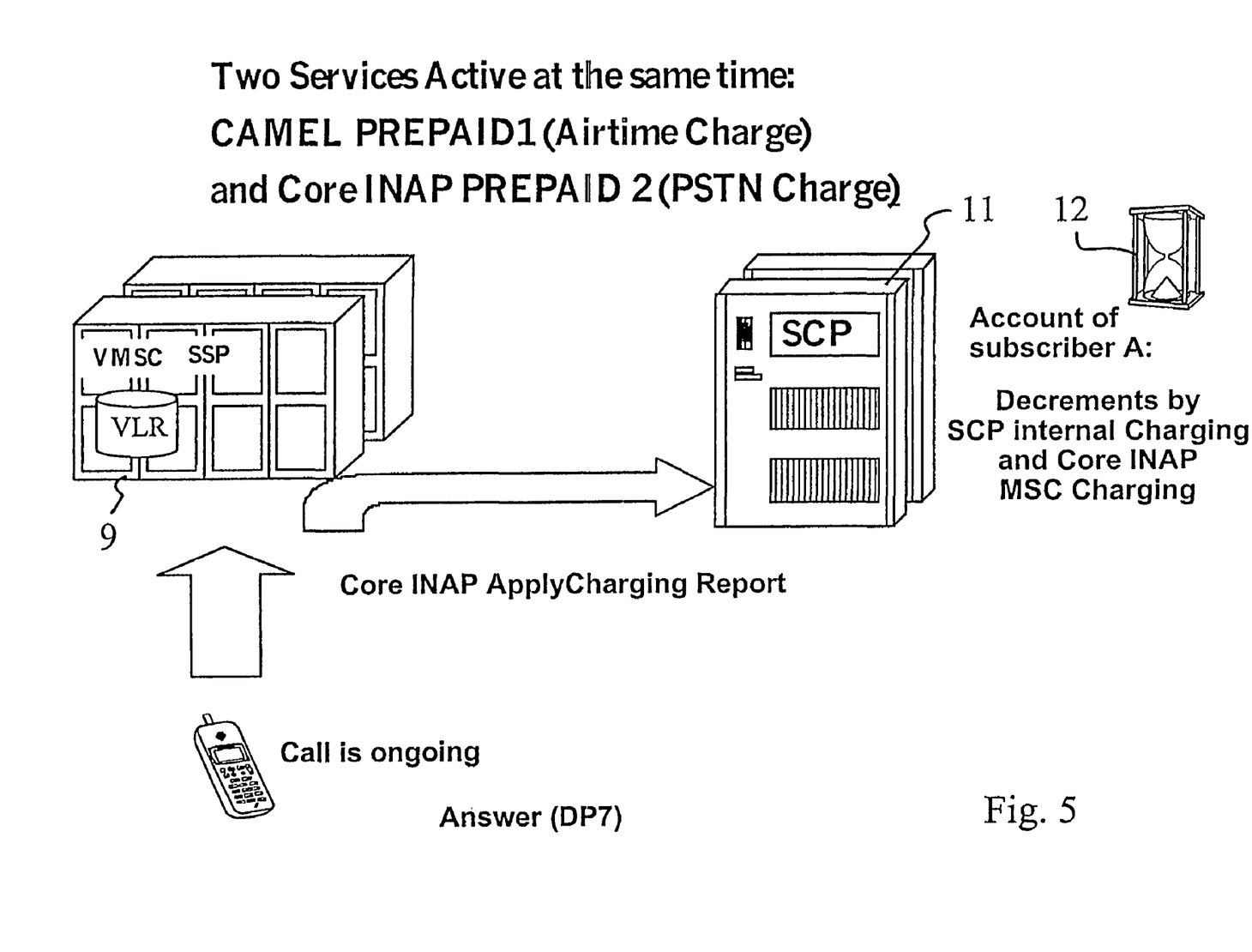
Figure 6:
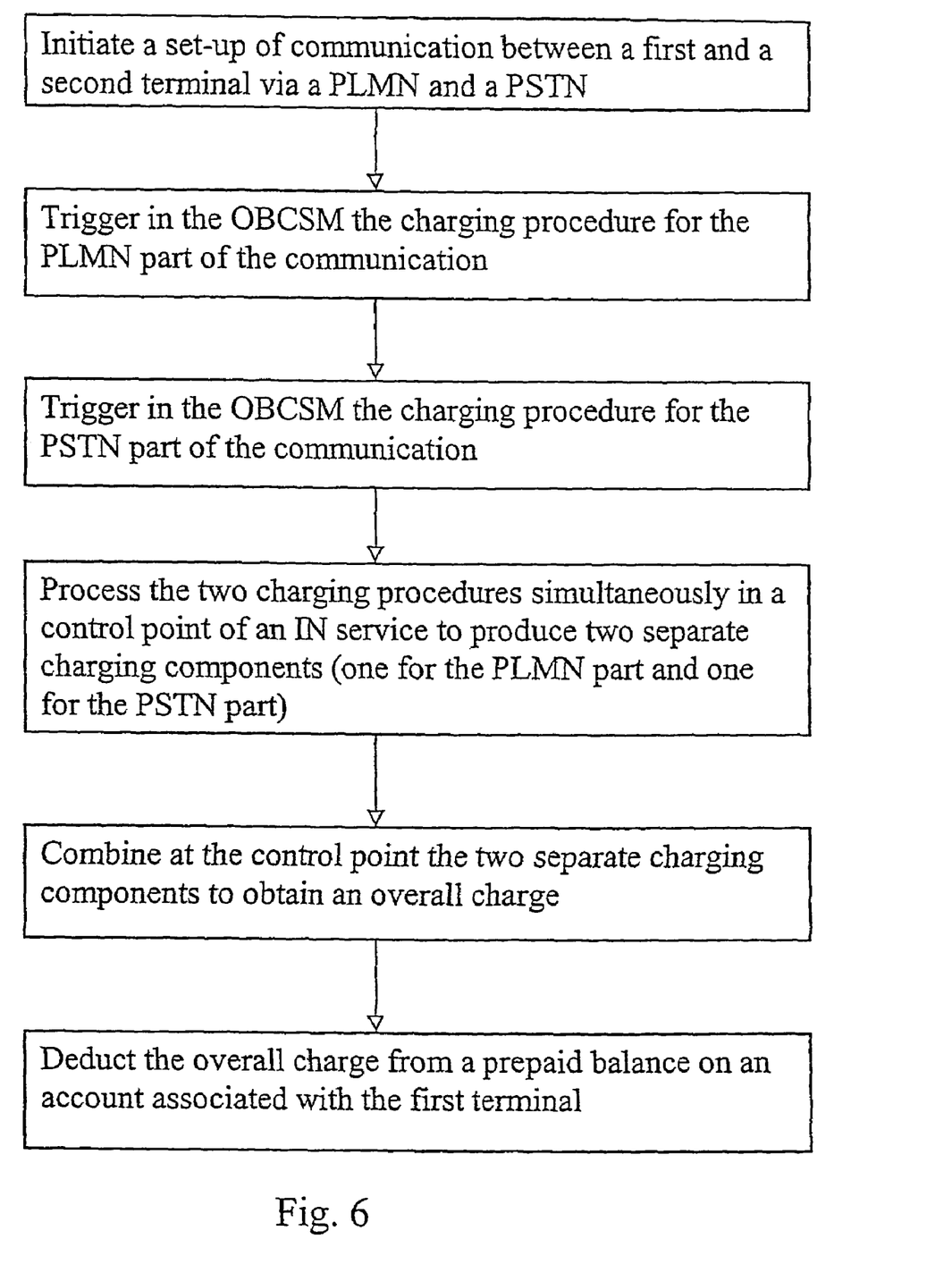
FIG. 6 is a flowchart illustrating the operation of one embodiment of the present invention.

Reference is now made to FIGS. 3 to 5 illustrating the preferred embodiment employing two separate prepayment service functions in a SCP node 11 for charging a connection initiated by a mobile station A and received by another station B subscribing to another network.

Two different protocols are used for the overall call charging. As shown by FIG. 3, in the preferred embodiment a CAMEL Phase 2 i.e. CAP Phase 2 protocol is used for the airtime charging in the OBCSM call state for the mobile station A. FIG. 4 in turn shows use of Core INAP for the PSTN charging between the SCP 11 and the MSC 9. Core INAP is a protocol defined by the European telecommunications Standards Institute (ETSI). FIG. 5 shows the situation during the ongoing call between the terminals 5 and 6, i.e. when the two different charging services initiated in FIGS. 3 and 4 are active at the same time.

As shown in FIG. 4, a feature interaction manager 13 may be provided in the system to handle the processing of the different protocols and the triggering required in the Originating Basic Call State Model (OBCSM) of the Intelligent Network Application Part (INAP) protocol suite. The feature interaction manager 13 may be implemented in association with the mobile switching center 9. In a preferred embodiment the feature interaction manager is implemented in the call processing software of the mobile switching center 9.

The triggering in the SSP 10 may be adapted to occur substantially at the same time for the two protocols during the call set-up procedure. As a result, the two protocols can be processed simultaneously at the SCP 11. The intelligent network (IN) arrangement can be adapted to define the two charging components independently from each other when the CAMEL and Core INAP Protocols are used simultaneously. In the case of a speech call between the two terminals, the call is triggered twice before the establishment of the real speech connection. A preferred order for the triggering is such that the CAMEL protocol i.e. the airtime charging is triggered first and the INAP protocol i.e. the fixed line charging is triggered next. The speech connection is established only after these two triggering and necessary tariff definitions.

As already mentioned, airtime charge can be defined based on use of the CAMEL phase 2 protocol. The SCP may use an appropriate internal charging scheme for the calculation of the airtime charging component and an appropriate charging software.

The PSTN component may be defined by using Core INAP protocol and MSC charging scheme that is controlled by the SCP 11. PSTN tariff structures may need to be defined by the operator and stored to a service management point (SMP) e.g. via a service management interface (SMI) client. The tariff plan may be changed if necessary. These features as such are known by the skilled person, and will be not explained in more detail.

The two triggerings are needed when a mobile subscriber (A-number) calls to a PSTN subscriber (B-number) in order to initiate simultaneous separate computation of the two separate charging components before the call connection is established. The first triggering preferably occurs in the CAMEL DP2 as the call is initiated. In FIG. 3 the first triggering is shown to initiate 'paid 1 service' procedure at the SCP 11 for the airtime charging component. This procedure may comprise the following steps: checking of the time and/or day, checking the subscriber category or class, checking the account information, starting internal charging and so on.

The second triggering occurs in the Core INAP TDP3 based on B-number analyses. In FIG. 4 the second triggering is shown to initiate 'prepaid service 2' procedures at the SCP 11 for the PSTN component. The second procedure may comprise the following steps: checking of the time and/or day, checking the B-number and dependencies it may have, checking call distance information, obtaining the PSTN tariff, and so on.

The B-number analysis comprises determination whether the B-number is a PSTN number or another mobile station number subscribing to the same network as station 6. If the B-number is detected to be another number in the same network or a number of any other such network which does not require calculation of a second charging component, no further triggering will occur and the 'prepaid 2 service' will not be activated. Instead, the charging may be handled in a usual way.

After the checking procedures and the activation of the 'prepaid 2 service' the SCP 11 will provide the MSC with necessary information, such as with 'send charging information' (SCI: this is an INAP operation) parameters regarding e.g. the charging zone and e-parameter as well as RRB parameters ('Request Report BCSM': an INAP operation) may be provided to the MSC 9 and the call may be connected. During the call the MSC may provide the SCP with an INAP message 'Apply Charging Report' regarding the PSTN charging in accordance with the definitions by the SCP. The balance in the A-subscriber account is then decrement based on the report. This report includes information such as time value or pulse amount that may be used in the determination of the cost of the PSTN part of the call. During the charging procedure the determined components for the 'prepaid 1 service' and 'prepaid 2 service' are combined by the SCP and the overall call charge is decrement from the common account 12.

Thus, by means of the two triggerings the two required charging components can be determined independently from each other. Instead of having separate accounts for the two charging components, only one prepaid account 12 is provided in the SCP 11. The balance on the account 12 is consumed based on the combined charge.

The final calculation i.e. the possible converting and combining of the separate charging components occurs in the above described embodiment in the service control point 11. The charging components may be both computed at the service control point. Alternatively, at least one charging component or basic information required for the determination of a charging component may be computed at the network controller 9. The overall control of the computation of the individual charging components will be handled by the service control point 9. If calculated by the controller 9, the reporting of information associated with the different charging components to the service control point 11 may occur in separate messages. The service control point may then combine the information transported in the separate messages to obtain the total charge for the connection.

The MSC 9 may generate CDR's (call detailed record comprising charging ticket in the MSC or in the SCP) if these are needed e.g. for post processing purposes or clearing purposes between the operators.

The operators may be able to use the existing functionality when defining any post paid tariffs in the billing system. To be able to accomplish this a connection to the IN may be needed.

According to one possibility same charging service may be used with roaming subscribers than with the actual subscribes of a network. However, if a subscriber roaming in a PLMN calls e.g. to a PSTN subscriber, this may need some cooperation between the operators of these two networks. Some routing rules may also be required to be defined in the home network of the subscriber. That may be required when the call is triggered for the first time in the visited PLMN and routed to the home PLMN, since the call has to be triggered again for example in the International gateway Exchange (e.g. in a TDP3 based on B-number analyses) in order to enable definition of the PSTN component. Naturally, this is needed only if a PSTN component is needed and the call is a PSTN terminated call.

The above described combining of the two (or several) components together may assist in solving the problem relating to different types of charging schemes. Calculation of the two individual charging components e.g. in the MSC 9 may be initiated for the two individual charging components in the same OBCSM. The SCP 11 may therefore start using the two (or more) charging models simultaneously. The embodiments avoid transmission of charging messages in the ISUP, e.g. for enabling charging of the prepaid customers during the call. Instead, the originating network operator himself may prepare a substantially accurate charging component(s) for the use of the other network(s) and charge the subscriber accordingly in real time. The embodiments may use existing software and/or hardware functions. The embodiments may be based on the functionality of existing a mobile switching center/home location register (MSC/HLR) and IN arrangements.

It should be appreciated that whilst embodiments of the present invention have been described in relation to mobile stations, embodiments of the present invention are applicable to any other suitable type of user equipment.

It should be appreciated that an IN based prepayment service may be implemented within the same node with the other IN services that may be provided for the A-subscriber 6. The service switching point and control point may also be implemented within one node (e.g. within a telephone exchange or a radio network controller or a switching centre). In such case the integrated node then functions for both detection of connections requiring use of IN services and execution of the service logic.

The embodiment of the invention has discussed the triggering from a SSP and processing in a SCP. Embodiments of the present invention can be applied to other network elements where applicable.

It is also noted herein that while the above describes exemplifying embodiments of the invention, there are several variations and modifications which may be made to the disclosed solution without departing from the scope of the present invention as defined in the appended claims.

The invention claimed is:

1. A method for charging in communication system, the method comprising the steps of:
   initiating a set-up procedure for a communication between a first station and a second station, the first station being associated with a first communication system and the second station being associated with a second communications system, the communication using chargeable resources of the first communication system and the second communication system, at least one of said communication systems providing wireless communication services;
   triggering in a charging function provided in one of the communication systems a first procedure for obtaining a first charging component for the communications, the first charging component being associated with the first communication system and determined based on a first charging model;
   triggering in the charging function a second procedure for obtaining a second charging component for the communications, the second charging component being associated with the second communication system and determined based on a second charging model;
   obtaining the respective first and second charging components by simultaneously processing in the charging function information associated with the communications in the first and second communication systems based on the first and second charging models;
   obtaining a total charge by combining the first and second charging components; and
   decreasing a prepaid balance during the communications based on the total charge.

2. A method as claimed in claim 1, wherein the first communication system comprises a mobile communications network providing wireless communication services for mobile stations.

3. A method as claimed in claim 1, wherein the second communication system comprises a fixed line communication network.

4. A method as claimed in claim 3, wherein the fixed line communication network comprises a public switched telephone network.

5. A method as claimed in claim 1, wherein the first and the second charging procedures are triggered in a controller of the first communication system.

6. A method as claimed in claim 5, wherein the controller comprises a switching center of the first communication system.

7. A method as claimed in claim 1, wherein determination of each of the charging components is based on the charging and tariffs scheme used by the respective communication system.

8. A method as claimed in claim 1, wherein said simultaneous processing is accomplished in a controller of an additional service.

9. A method as claimed in claim 8, wherein the controller comprises a service control point of an intelligent network arrangement.

10. A method as claimed in claim 1, wherein at least a part of the simultaneous processing is accomplished in a controller of the first communication system.

11. A method as claimed in claim 1, wherein the triggering of the first and second procedures is accomplished at a service switching point of an intelligent network arrangement.

12. A method as claimed in claim 8, wherein the balance is decreased during the communications from a prepayment account implemented by the additional service.

13. A method as claimed in claim 1, comprising triggering a procedure for determining at least one further charging component and simultaneous processing of said at least one further charging component in the charging function.

14. A method as claimed in claim 1, comprising a step of converting at least one of the obtained charging components to a form that can be combined with at least one other of the charging components.

15. A method as claimed in claim 1, wherein one of the charging components is obtained based on intelligent network application protocol (INAP) and another one of the charging components is obtained based on customised applications for mobile network enhanced logic application part protocol (CAP).

16. A method as claimed in claim 1, comprising a step of analysing if determination of the second charging component is required prior initiating the processing for obtaining said second charging component.

17. A method as claimed in claim 1, wherein the triggering of the first and second procedures occurs during an originating phase of the call set-up procedures, preferably during originating phase basic call state model (OBCSM).

18. An arrangement for communication systems, comprising:
   a node in a first communication system for initiating a set-up procedure for a communication between a first station and a second station via the first communication system and a second communication system, wherein the first station is associated with the first communication system and the second station is associated with the seconding communication system, at least one of said communication systems providing wireless communications;
   trigger means for starting a first procedure for obtaining a first charging component for the communications, the first charging component being associated with the use of chargeable resources of the first communication system;
   trigger means for starting a second procedure for obtaining a second charging component for the communications, the second charging component being associated with the use of chargeable resources of the second communication system; and
   controller means in one of the communications systems responsive to triggering signals from the trigger means, the controller means being adapted for simultaneous processing of charging information associated with the communications in the first and second communication systems thereby obtaining the respective first and second charging components, said first charging component being determined based on a first charging model and the second charging component being determined based on a second charging model, for combining the first and second charging components thereby obtaining a total charge, and for decreasing a prepaid balance based on the total charge during the communications.

19. An arrangement as claimed in claim 18, wherein the trigger means are located in said node.

20. An arrangement as claimed in claim 18, wherein said node comprise a switching centre of a mobile communications network.

21. An arrangement as claimed in claim 18, wherein the trigger means comprise a service switching point of an intelligent network arrangement adapted to trigger the said two procedures during originating state of the set-up procedure.

22. An arrangement as claimed in claim 18, comprising a feature interaction manager for use in the control of the different charging models and the triggering.

23. An arrangement as claimed in claim 22, wherein the feature interaction manager is implemented in association with said node.

24. An arrangement as claimed in claim 22, wherein the feature interaction manager is implemented in a call processing software of said node.

25. An arrangement as claimed in claim 18, wherein the controller means comprises a service control point of an intelligent network.

26. An arrangement as claimed in claim 25, wherein the controller means comprises further a mobile switching centre.

* * * * *